(12) United States Patent
Mantell

(10) Patent No.: US 10,335,996 B2
(45) Date of Patent: Jul. 2, 2019

(54) USING DEPTH IN THREE-DIMENSIONAL OBJECT PRINTING TO FORM COLORS THAT CHANGE WITH VIEWING AND ILLUMINATION ANGLES

(71) Applicant: Xerox Corporation, Norwalk, CT (US)

(72) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 36 days.

(21) Appl. No.: 15/692,435

(22) Filed: Aug. 31, 2017

(65) Prior Publication Data

US 2017/0361526 A1 Dec. 21, 2017

Related U.S. Application Data

(62) Division of application No. 15/131,819, filed on Apr. 18, 2016, now Pat. No. 9,821,510.

(51) Int. Cl.
*B29C 64/112* (2017.01)
*B29C 64/393* (2017.01)
(Continued)

(52) U.S. Cl.
CPC .......... *B29C 64/112* (2017.08); *B29C 64/393* (2017.08); *B44F 1/14* (2013.01); *H04N 1/6088* (2013.01); *B29K 2105/0032* (2013.01); *B29K 2995/0021* (2013.01); *B29K 2995/0026* (2013.01); *B33Y 10/00* (2014.12);
(Continued)

(58) Field of Classification Search
CPC ......... B33Y 50/02; B33Y 10/00; B33Y 80/00; Y10T 428/24802
See application file for complete search history.

(56) References Cited

U.S. PATENT DOCUMENTS

| 4,968,064 A | 11/1990 | Mancuso |
| 6,176,521 B1 | 1/2001 | Mancuso |

(Continued)

FOREIGN PATENT DOCUMENTS

WO 2015/142587 A1 9/2015

OTHER PUBLICATIONS

Canadian Examination Search Report corresponding to Canadian Application No. 2,962,990; dated May 2, 2018; 5 Pages.

*Primary Examiner* — Betelhem Shewareged
(74) *Attorney, Agent, or Firm* — Maginot Moore & Beck LLP

(57) ABSTRACT

A three-dimensionally printed object includes a plurality of different material regions that together define a surface region of the object. The plurality of different material regions includes a first material region and a second material region. The first material region has a first color, and the second material region has a second color that is different from the first color. The different material regions overlap from each other within the object by different amounts viewed from different directions so that different proportions of light from the plurality of different material regions are visible to an observer viewing the surface region of the three-dimensionally printed object from different view directions, different view angles, and with illumination lighting the surface region at different angles. A coloration of the surface region is altered based on the proportions of light from the plurality of different material regions visible to the observer.

18 Claims, 11 Drawing Sheets

(51) Int. Cl.
  *B44F 1/14* (2006.01)
  *H04N 1/60* (2006.01)
  *B33Y 10/00* (2015.01)
  *B33Y 50/02* (2015.01)
  *B33Y 80/00* (2015.01)
  *B29K 105/00* (2006.01)

(52) U.S. Cl.
  CPC ............... *B33Y 50/02* (2014.12); *B33Y 80/00* (2014.12); *Y10T 428/24802* (2015.01)

(56) References Cited

U.S. PATENT DOCUMENTS

| | | |
|---|---|---|
| 2005/0275709 A1 | 12/2005 | Yung |
| 2014/0277661 A1 | 9/2014 | Amadio et al. |
| 2015/0094394 A1 | 4/2015 | Jung et al. |
| 2015/0142159 A1 | 5/2015 | Chang |
| 2015/0197060 A1 | 7/2015 | Carr et al. |
| 2015/0239270 A1 | 8/2015 | Attia |
| 2015/0250201 A1* | 9/2015 | Mantell ................ A23G 1/0066 426/303 |
| 2015/0258770 A1 | 9/2015 | Chan et al. |
| 2015/0273856 A1 | 10/2015 | Miller |
| 2015/0352783 A1 | 12/2015 | Snyder et al. |
| 2015/0375451 A1 | 12/2015 | Voris et al. |
| 2016/0236410 A1 | 8/2016 | Ohnishi |

\* cited by examiner

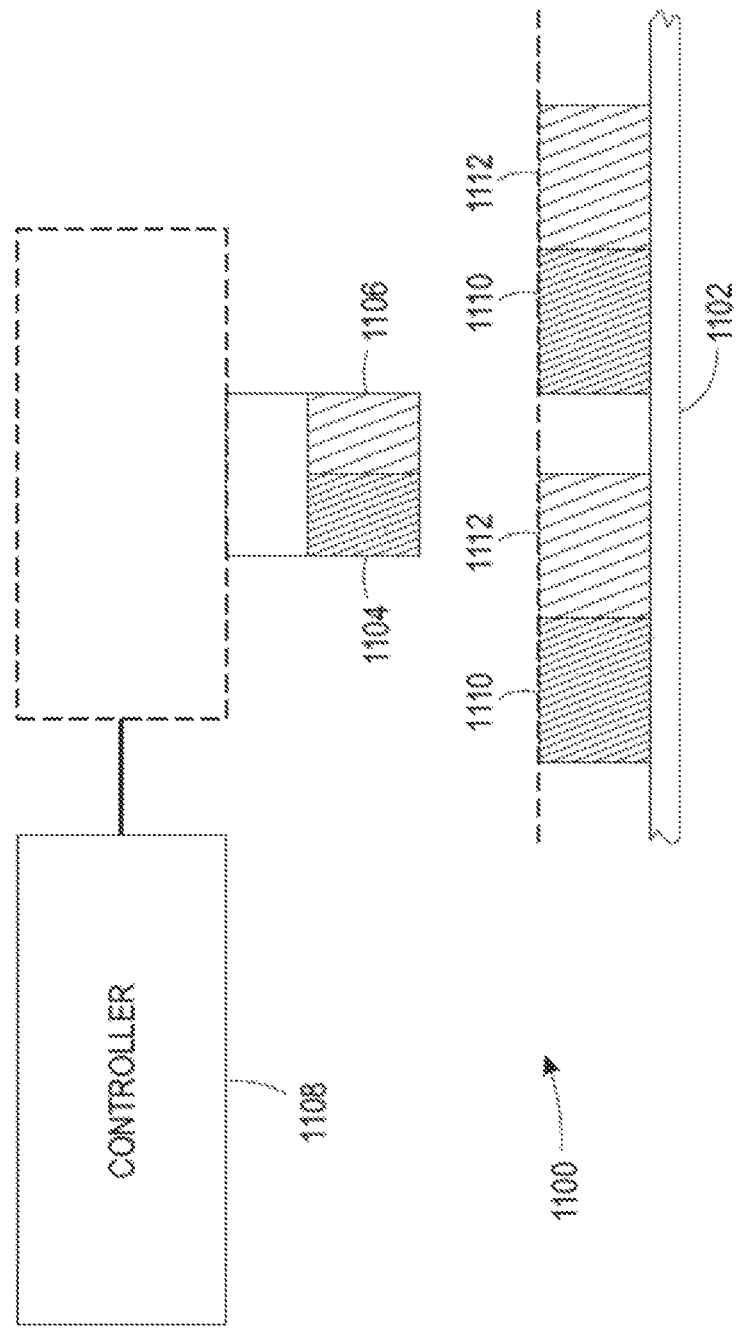

USING DEPTH IN THREE-DIMENSIONAL OBJECT PRINTING TO FORM COLORS THAT CHANGE WITH VIEWING AND ILLUMINATION ANGLES

PRIORITY CLAIM

This application is a divisional application of and claims priority to U.S. patent application Ser. No. 15/131,819, which is entitled "Using Depth In Three-Dimensional Object Printing To Form Colors That Change With Viewing And Illumination Angles," which was filed on Apr. 18, 2016, and which issued as U.S. Pat. No. x,xxx,xxx on mm/dd/yyyy.

TECHNICAL FIELD

This disclosure relates generally to three-dimensional object printing, and, in particular, to printing three-dimensional objects with colors that change based on viewing and illumination angles and directions.

BACKGROUND

Various techniques have been used to form objects with iridescent surfaces, i.e., a surface that appears to change color as the angle of view or the angle of illumination of the surface changes. In one example, a diffraction grating disposed on a surface is used to reflect or transmit different portions of incident light. The different light portions are seen as a view of an image that changes as the angle of incidence changes. In another example, multiple images are separated into strips, interlaced with each other on a surface, and overlaid with lenticular lenses. The lenses are aligned with the interlacing of the images so that light from each individual image is sent in a same respective direction. This configuration reveals different images to an observer over different view angles. In a further example, regions of a surface are embossed to have a periodic variation in a respective direction. The regions are colored with variations aligned with the periodic variation to enable a change in viewing angle to hide, subdue, or highlight one or more of the colors.

Known techniques of forming an iridescent surface on an object, such as the foregoing examples, generally consist of regions that only change color over a single view axis. For example, an image may change as an observer's view is shifted left-right, but does not change when the view is shifted up-down, or toward-away, or when the view is rotated. In another example, some iridescent paints, such as pearlescent paints, change color based on view angle, but change in the same manner regardless of view direction. Additionally, iridescent surfaces typically require a structured surface, e.g., a diffraction grating, lenticular lenses, or embossed ridges, or are limited in terms of what color changes are available. These structured surfaces increase the expense and complexity of forming an iridescent surface, and result in a surface that is susceptible to damage that can interfere with the intended coloration of the surface. Additionally, such structures are impractical or impossible to form on a three-dimensional printed object that has a non-planar or irregular shape that changes color along more than one axis.

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Techniques have also been developed for coloring the surface of three-dimensional printed objects that include applying coloration after an object has been printed, and printing an object from different materials having different colors. However, three-dimensional printing has not been adapted to forming iridescent objects. Therefore, additive manufacturing processes that produce three-dimensional objects with surfaces having a coloration that changes when viewed at different angles and directions and illuminated with light from different angles would be beneficial.

SUMMARY

To facilitate the three-dimensional printing of objects with iridescence, in particular iridescent three-dimensional objects having irregular shapes and surfaces, a three-dimensional object according to this disclosure includes a plurality of different material regions that together define a surface region of the three-dimensionally printed object. The plurality of different regions includes a first material region having a first color and a second material region having a second color that is different from the first color. The different material regions overlap each other by different amounts viewed from different directions to enable different proportions of light from the plurality of different material regions to be visible to an observer viewing the surface region of the three-dimensionally printed object from different view directions, different view angles, and with illumination lighting the surface region at different angles. The arrangement of the plurality of different material regions also enables a coloration of the surface region of the three-dimensionally printed object to be altered based on the proportions of light from the plurality of different material regions visible to an observer.

An exemplary system according to this disclosure is configured to modify three-dimensional data for printing a three-dimensional object so that the three-dimensional object has a surface region having different color arrangements visible to an observer viewing the surface region from different view directions, different view angles, and with illumination lighting the surface region at different angles. The system includes a memory, an input device, a processor, and an output device. Three-dimensional data for operating a printer to print a three-dimensional object is stored in the memory. The input device is configured to receive data corresponding to at least two different color arrangements for the surface region of the three-dimensional object, and data corresponding to at least one of a view direction, a view angle, and an illumination angle assigned to each different color arrangement. The processor is configured with programmed instructions stored in the memory that enable the processor to modify the three-dimensional data to operate a three-dimensional object printer to form the three-dimensional object with different color arrangements visible to an observer viewing the surface region from different view directions, different view angles, and with illumination lighting the surface region at different angles. The processor is thereby configured to generate a color change map for the surface region of the three-dimensional object with reference to a portion of the three-dimensional data corresponding to a geometry of the surface region of the three-dimensional object, the data received by the input device that corresponds to at least two different color arrangements for the surface region, and the data received by the input device that corresponds to the at least one of the view direction, the view angle, and the illumination angle assigned to each different color arrangement. The processor generates a model of the three-dimensional object that includes data corresponding to a plurality of different material regions that together define a model surface region of the model and that overlap by different amounts viewed from different directions to enable identification of different proportions of light from the different material regions that are visible to an observer viewing the model surface region from different view angles, different view directions, and with illumination lighting the model surface region at different angles. The processer simulates a view of an observer viewing the model surface region with reference to the data corresponding to the at least one of the view direction, the view angle, and the illumination angle assigned to each different color arrangement and identifies different proportions of light from the different material regions that are visible to the observer from the at least one of the view direction, the view angle, and the illumination angle assigned to each different color arrangement with reference to the simulated view of the observer. The processor generates a color change map of the model surface region with reference to the identified proportions of light from each material region visible to the observer and compares the generated color change map of the model surface region to the generated color change map for the surface region of the three-dimensional object to measure a similarity of at least one of color hue and color location between the generated color change map of the model surface region and the generated color change map of the surface region of the three-dimensional object. The processor generates the model of the three-dimensional object in response to the measured similarity being less than a predetermined threshold at the at least one of the assigned view direction, view angle, and illumination angle, and continues the simulation of the observer viewing the model surface region, the identification of the proportions of light, the generation of the color change map of the model surface region, the comparison of the generated color change map of the model surface region to the generated color change map for the surface region of the three-dimensional object, and the generation of the model of the three-dimensional object with reference to the measured similarity until the measured similarity between the generated color change map for the surface region of the three-dimensional object and the generated color change map of the model surface region is greater than the predetermined threshold at the at least one of the assigned view direction, view angle, and illumination angle. Once the measured similarity is greater than the predetermined threshold, the processor modifies the three-dimensional data for printing the three-dimensional object with reference to the generated model of the three-dimensional object that had the measured similarity that was greater than the predetermined threshold at the at least one of the assigned view direction, view angle, and illumination angle, and transmits the modified three-dimensional data to the three-dimensional object printer to enable the printer to produce the three-dimensional object with the surface region having the at least two different color arrangements visible to an observer viewing the surface region from the at least one of view direction, view angle, and illumination angle assigned to each different color arrangement.

An exemplary method for operating a three-dimensional object printer to print an iridescent three-dimensional object according to this disclosure includes operating a plurality of ejectors of the three-dimensional printer with a controller to form a plurality of different material regions that together define a surface region of the three-dimensionally printed object. The operating of the ejectors to form the plurality of different material regions includes operating a first subset of the plurality of ejectors that eject drops of a material having a first color to form a first material region of the first color, and operating a second subset of the plurality of ejectors that eject drops of a material having a second color that is different than the first color to form a second material region of the second color. The plurality of different material regions overlap each other by different amounts viewed from different directions to enable different proportions of light from the plurality of different material regions to be visible to an observer viewing the surface region of the three-dimensionally printed object from different view directions, different view angles, and with illumination lighting the surface region at different angles. The arrangement of the plurality of the different material regions also enables a coloration of the surface region of the three-dimensionally printed object to be altered based on the proportions of light the first material region and second material region visible to the observer.

BRIEF DESCRIPTION OF THE DRAWINGS

The foregoing aspects and other features of the present disclosure are explained in the following description, taken in connection with the accompanying drawings.

FIG. 11 is a schematic of an exemplary embodiment of a three-dimensional object printer for printing a three-dimensional object according to this disclosure.

DETAILED DESCRIPTION

Figure 1:
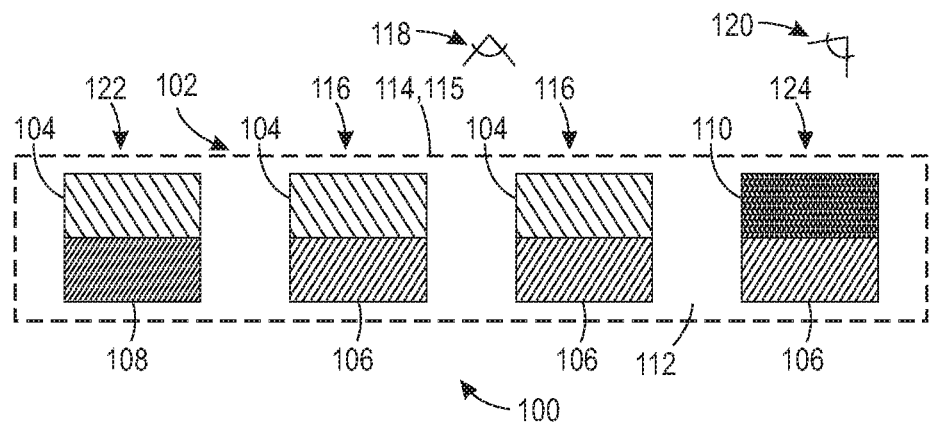
FIGS. 1-5 are side cross-section views of different exemplary embodiments of three-dimensionally printed objects with surfaces having an apparent coloration that changes over different view angles, view directions, and illumination angles according to this disclosure.

For a general understanding of the present embodiments, reference is made to the drawings. In the drawings, like reference numerals have been used throughout to designate like elements.

FIG. 1 illustrates a side cross section view of an exemplary embodiment of a three-dimensional object 100 according to this disclosure. The object 100 includes first material regions 104, second material regions 106, a third material region 108, a fourth material region 110, and a fifth material region 112. The material regions 104-112 are collectively referred to as a plurality of material regions 102. The fifth material region encapsulates the remainder of the material regions 102, which are assembled into various arrangements 116, 122, and 124. Each arrangement 116, 122, and 124 includes at least two different material regions having different colors, as described in more detail below. The arrangements 116, 122, and 124 are spaced apart from each other by portions of the fifth material region.

The fifth material region 112 defines a surface region 114 of the object 100, and is at least partially transparent such that the various arrangements 116, 122, and 124 are at least partially visible through a surface 115 of the surface region 114. The remaining material regions 102 overlap each other by different amounts viewed from different directions to enable different proportions of light from the plurality of different material regions 102 to be visible to an observer viewing the surface region 114 of the three-dimensionally printed object 100 from different view directions, different view angles, and with illumination lighting the surface region at different angles. In this embodiment, the first material regions 104 are magenta, the second material regions 106 are cyan, the third material region 108 is yellow, and the fourth material region 110 is black, but other colorations and combinations of colorations are also contemplated.

In each of the arrangements 116, a first material region 104 and a second material region 106 are at different distances from the surface 115, the first material region 104 being closer to the surface 115 than the second material region 106. Due to this configuration, different portions of the first material region 104 and second material region 106 are visible to an observer viewing the surface region 114 at different view angles.

In this disclosure, various observers are described as viewing the surface regions of various objects. The reader should understand that the figures are not drawn to scale. Specifically, in FIG. 1 the plurality of material regions 102 are sized and arranged such that at least a portion of the sides of the various arrangements 116, 122, and 124 are visible to an observer viewing the surface region 114 at an oblique angle. Furthermore, unless otherwise stated, the various observers are viewing the objects under general diffuse light that illuminates the surface region of the object.

A first observer 118 in FIG. 1 is viewing the surface region 114 at a generally vertical angle, i.e., about 90 degrees relative to the surface region 114. From the perspective of the first observer 118, at least a portion of the second material region 106 in the arrangement 116 is obstructed from view by the first material region 104. Thus, from the perspective of the first observer 118, the apparent coloration of surface region 114 of the object 100 is generally magenta.

In comparison, a second observer 120 is viewing the surface region 114 at an oblique angle, i.e., an angle other than 90 degrees and 0 degrees. From the perspective of the second observer 120, at least a portion of the second material region 106 is visible beneath the first material region 104 in the arrangements 116. Since the second material region 106 is cyan, the apparent coloration of the surface region 114 from the perspective of the second observer 120 is a mixture of magenta from the first material region 104 with cyan from the second material region 106. The magenta and cyan are mixed in proportion to the portion of the second material region 106 visible relative to the portion of the first material region 104 visible in the arrangement 116. Thus, for a mostly vertical angle where only a small portion of the second material region 106 is visible, the apparent coloration of the surface region is generally magenta, but as the view angle becomes more oblique, a larger portion of the second material region 106 becomes visible to the second observer 120 and the apparent coloration of the surface 115 of the arrangement 116 changes toward blue, a mixture of cyan and magenta.

To form a larger portion of the surface region 114 having a consistent coloration behavior, multiple arrangements 116 are repeated next to each other. From the perspective of the observers 118 and 120, the repeated arrangements blend together and to present the appearance of a single coloration region. In this manner large regions of similar coloration can be formed regardless of a size of the individual material regions.

In arrangement 122, the third material region 108 is beneath the first material region 104 with reference to the surface 115. From the perspective of the first observer 118, the third material region 108 is obstructed from view by the first material region 104, and thus the apparent coloration of surface region 114 of the object at the arrangement 122 appears generally magenta similar to the surface region 114 at the arrangements 116. However, as the view angle becomes more oblique, a larger proportion of light from the third material region 108 becomes visible. Thus, from the perspective of the second observer 120, the apparent coloration of the surface region 114 shifts toward red due to the magenta from the first material region 104 mixing with the yellow from the third material region 108.

In arrangement 124, a second material region 106 is beneath the fourth material region 110 with reference to the surface 115. From the perspective of the first observer 118, the surface region 114 has a black coloration portion at the arrangement 124 due to the black from the fourth material region 110, and from the perspective of the second observer 120, the surface region has darkened cyan coloration portion from a mixture of the black from the fourth material region 110 and the cyan from the second material region 106. In this embodiment, the fifth material region 112 encapsulates the remaining material regions such that at least a portion of the fifth material region 112 is disposed between the remaining material regions 102 and the surface region 114. This portion of the fifth material region 112 can be configured as a protective coating that protects the remaining material regions from damage, abrasion, scratches, or the like.

Varying the material regions included in arrangements within the object 100, as with the arrangements 116, 122, and 124, enables the formation of different colorations of the surface region 114 at different view angles. Since FIG. 1 is a side cross section view, the reader should understand that the distribution of arrangements of the material regions 102 may extend over three dimensions. Thus, the arrangement of the material regions 102 can be used to form different images on the surface 115 that are visible at different view angles.

Additionally, although the spacing, size, and positioning of the material regions 102 in FIG. 1 are illustrated as being generally regular, the size, shape, and spacing of the material regions may be varied. The shape and size of a material region is related to the angular range in which that material region is visible, and the spacing and relative sizing between regions relates to the color mixing between material regions due to the portions of the overlapping material regions viewable at various angles. Thus, adjusting the shape, size, and spacing of the material regions can alter the color change behavior of the surface region 114 of the object 100.

The size of the material regions 102 may also be related to an intended view distance for an observer. In one embodiment, the material regions 102 are sized such that an observer viewing the surface region 114 of the object 100 from a predetermined distance perceives the plurality of material regions 102 as forming an unbroken coloration on the surface 115. Individual material regions can be sized on the order of centimeters, millimeters, tens of micrometers, or less.

Figure 2:
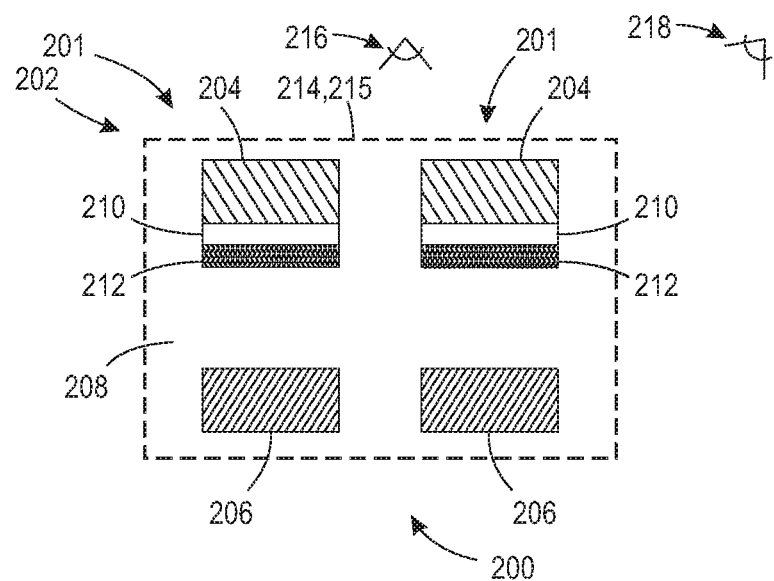

FIG. 2 illustrates another exemplary embodiment of a three-dimensional object 200 according to this disclosure. The object 200 includes an arrangement 201 having a first material region 204, a second material region 206, a fourth material region 210 and a fifth material region 212. The arrangements 201 are separated from one another and encapsulated by a third material region 208 that defines a surface region 214 of the object 200. The material regions 204-212 are collectively referred to as a plurality of regions 202. In this embodiment, the first material region 204 is magenta, and the second material region 206 is cyan, but other color combinations are also contemplated. The third material region 208 is at least partially transparent, the fourth material region 210 is white, and the fifth material region 212 is black.

The second material region 206 and the first material region 204 are at different distances from a surface 215 of the surface region 214, with the first material region 204 being closer to the surface 215. At least a portion of the transparent third material region 208 is disposed between the first material region 204 and second material region 206 with reference to the surface 215. This configuration enables a larger proportion of light from the second material region 206 to be visible from various view angles relative to the proportion of light from second material regions 106 visible at various angles in the embodiment illustrated in FIG. 1.

In some embodiments, one or more of the material regions 202 may not be completely opaque. The degree of translucence may result in undesired bleed-through of the color of material regions that are desirably obstructed from view, which can affect the apparent coloration of the surface region 214 of the object. In this embodiment, the white fourth material region 210 acts as a buffer or scattering material to inhibit bleed-through. The fourth material region 210 is disposed between the first material region 204 and the second material region 206 relative to the surface 215. Colored light that would otherwise be transmitted is instead scattered within the fourth material region 210 to inhibit cyan light from the second material region 206 from transmitting through the first material region 204.

In some embodiments, the third material region 208 may not be completely transparent so light passing through the region is scattered to some degree. Scattering may result in colored light being visible on the surface region 214 from undesired view angles. For example, some amount of light reflected from or transmitted from the cyan second material region 206 may scatter within the third material region 208. Even though the second material region 206 is obstructed from view by the first material region 204 from the perspective of the first observer 216, a portion of scattered cyan light from the second material region 206 may exit the surface region 214 in a manner visible to the first observer 216.

In the embodiment of FIG. 2, the fifth material region 212 acts as a scatter guard that inhibits the scattering of light within the third material region 208 being visible in the region of the scatter guard. In this embodiment, the fifth material region 212 is black, but other material regions of other colors can also be used as a scatter guard in other embodiments. Light that would otherwise be scattered through the third material region 208 in a vicinity of the first material region 204 is instead absorbed or blocked by the scatter guard. In this way, the coloration of the surface region from the perspective of the first observer 216 is not distorted by scattered light from obstructed material regions. In another embodiment (not shown), a scatter guard material region is disposed to at least partially surround the second material regions 206.

As illustrated in FIG. 2, the fourth material region 210 and fifth material region 212 are thinner than the first material region 204 and second material region 206. This difference in thickness reduces the contribution of the white and black colors from the fourth material region 210 and fifth material region 212, respectively, on the apparent coloration of the surface region 214 as seen by the second observer 218.

Figure 3:
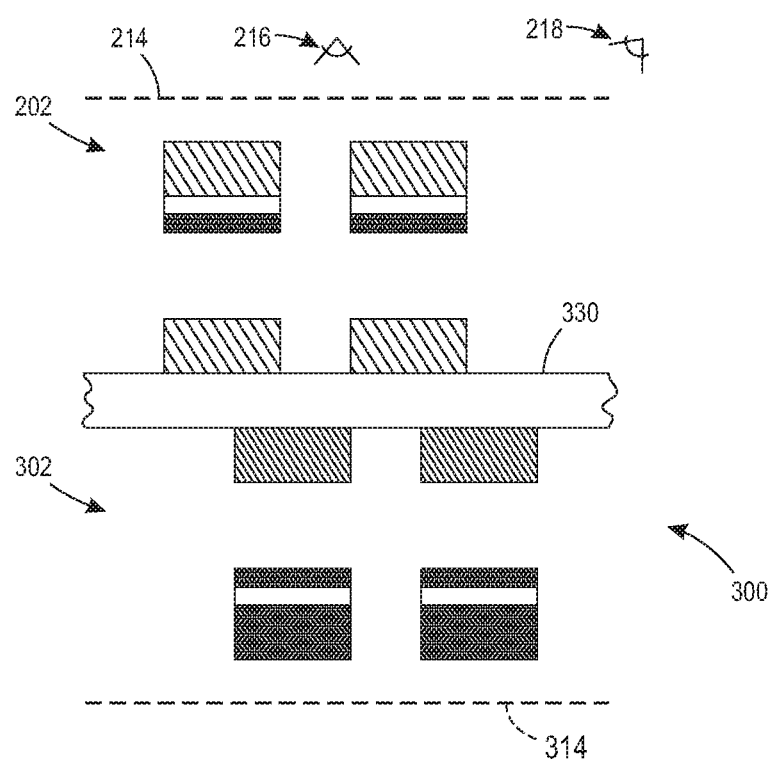

FIG. 3 illustrates a further exemplary embodiment of a three-dimensional object 300 according to this disclosure. The object 300 includes a first plurality of material regions 202 that are similar to the plurality of regions discussed above with regard to FIG. 2. The object further includes a plurality of material regions 302 that define another surface region 314 and a base 330 disposed between the first material regions 202 and the second material regions 302. In this embodiment, the base 330 is white and acts as a buffer to inhibit bleed-through between the first material regions 202 and the second material regions 302. This buffer enables the surface regions 214 and 314 of the three-dimensional object 300 to have different coloration behaviors that do not interfere with each other. Although the base 330 is white in this embodiment, bases of other colors and of combinations of colors are also contemplated. Additionally, although the base 330 illustrated in FIG. 3 is a generally planar member, other configurations are also contemplated. For example, the base 330 can have irregular surface regions and can have any three-dimensional shape.

Figure 4A:
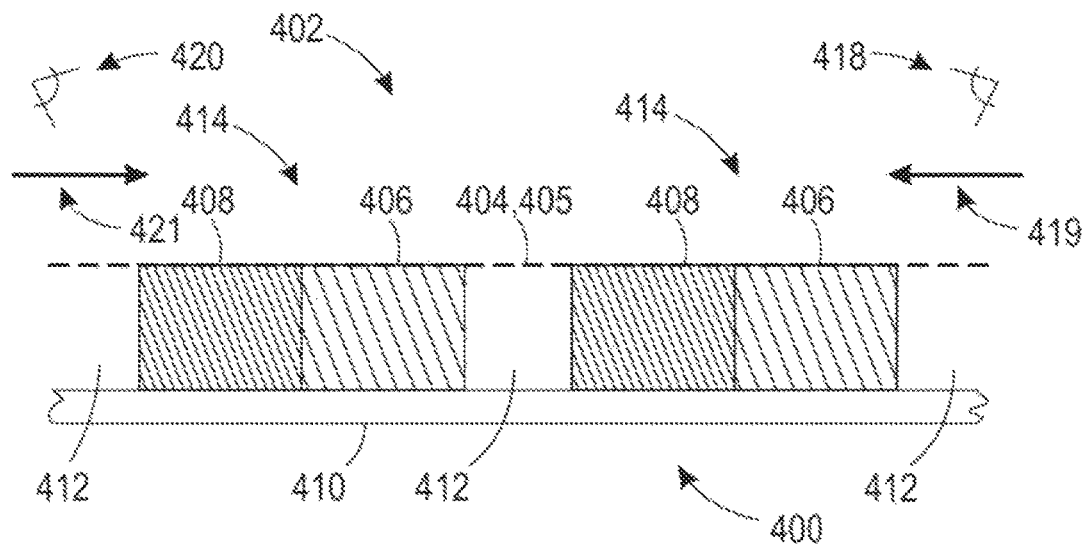

FIG. 4A illustrates a further embodiment of a three-dimensional object 400 according to this disclosure. The object 400 includes arrangements 414 that each include a first material region 406 and a second material region 408. The object 400 also includes transparent material regions 412 disposed between the arrangements 414 and a base 410 that supports the arrangements 414 and the transparent material regions 412. The material regions 406, 408, and 412 are collectively referred to as a plurality of material regions 402. Unlike the embodiments illustrated in FIGS. 1-3, a surface 405 of the surface region 404 is not defined solely by the transparent material region 412. Instead, the surface 405 is defined by the first material regions 406 and second material regions 408 together with the transparent material regions 412.

In this embodiment, the first material region 406 is yellow, and the second material region is cyan, but other color combinations are also contemplated in other embodiments. In each arrangement 414, the first material region 406 overlaps with the second material region 408 in a direction generally parallel to the surface 405. As discussed below, this configuration enables different apparent colorations of the surface region 404 from different view directions.

From the perspective of a first observer 418 viewing the surface region 404 from a first view direction 419, a larger proportion of light from the first material region 406 is visible than of the second material region 408 since at least a portion of the second material region 408 is obstructed from view by the first material region 406. In other words, while only a top surface region of the second material region 408 facing the surface 405 is visible to the first observer 418, both the top portion of the first material region 406 facing the surface 405 and a side portion visible through a transparent material region 412 are visible. Thus, from the perspective of the first observer 418, the apparent coloration of the surface region 404 is generally yellow. From the perspective of a second observer 420 viewing the surface region 404 from a second view direction 421, a larger proportion of light from the second material region 408 is visible than of the first material region 406. From the perspective of the second observer 420, however, the apparent coloration of the surface region 404 is generally cyan. Additionally, as the view angle of an observer approaches 90 degrees from either view direction, the apparent coloration of the surface region 404 shifts toward green due to the generally equal visible proportions of light from the first material region 406 and second material region 408 so the cyan and yellow lights mix together. If the first material regions 406 and second material regions 408 are at least partially transparent, colored light from one of the colored material regions may bleed through to the other. Additionally, if the transparent material region 412 is not sufficiently transparent, colored light from the first and second material regions 406 and 408 may at least partially scatter and be visible from undesirable view angles.

Figure 4B:
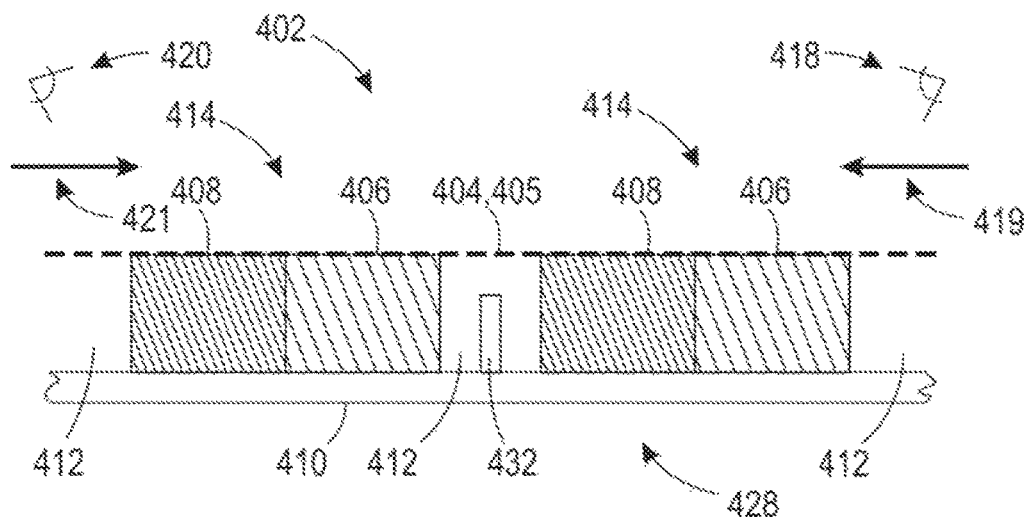

FIG. 4B illustrates another exemplary embodiment of a three-dimensional object 428 that is similar to the object 400 illustrated in FIG. 4A, but additionally includes scatter guards 432. In some embodiments, the three-dimensional object 428 additionally includes buffers disposed between the first material regions 406 and the second material regions 408 in each arrangement 414, and configured to inhibit bleed-through of light from one colored material region to the other. For example, see the first portion 504 of the material region 502 in FIG. 5. In some embodiments, the buffers are white, but buffers of other colors are also contemplated. Additionally, in some embodiments, the buffers are narrow compared to the first and second material regions 406 and 408. A narrower buffer can limit the impact of the color of the buffer on the coloration of the surface region 404 of the object 428.

The scatter guards 432 are disposed within the transparent material regions 412 between the arrangements 414 of the first and second material regions 406 and 408, and are configured to limit an amount of scattering that occurs within the transparent material regions 412. In this embodiment, the scatter guards 432 are white so as to be a same color as the base 410. Having a scatter guard 432 with a same color as the base 410 can limit the impact of the color of the scatter guard 432 on the coloration of the surface region 404 of the object 428. Scatter guards of other colors and colorations are also contemplated. In this embodiment, the scatter guards 432 have a height that is lower than the height of the first and second material regions 406 and 408. Having a scatter guard 432 with a lower height than the colored regions in an object enables the scatter guard to limit the scattering that occurs in the transparent material 412 without significantly obstructing the visibility of the sides of the colored regions from the perspective of observers viewing the surface region 404 at an oblique angle.

Figure 5:
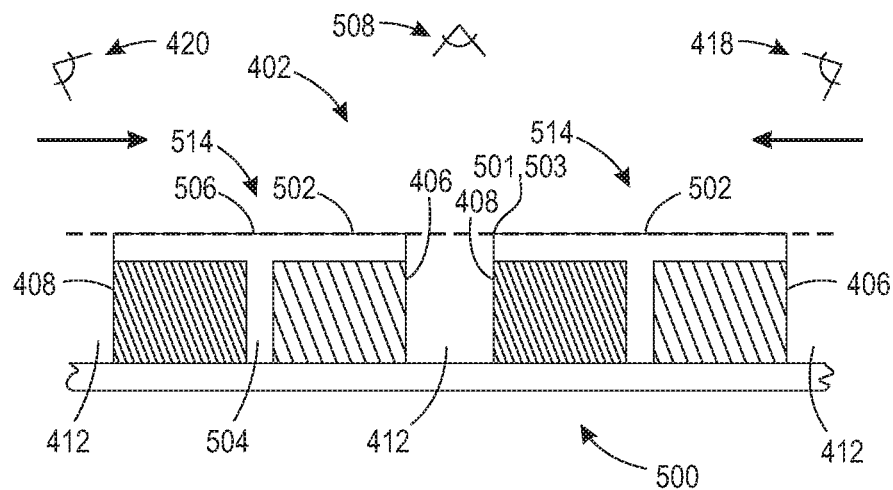

FIG. 5 illustrates another exemplary embodiment of a three-dimensional object 500 that includes arrangements 514 that are similar to the arrangements 414 in FIGS. 4A and 4B. Each arrangement 514 also includes a first material region 406 and a second material 408 that overlap in a direction parallel to the surface region 501. However, each arrangement 514 further includes a third material region 502 that is white. A first portion 504 of the third material region 502 is disposed between the first material region 406 and second material region 408 and acts as a buffer to inhibit bleed-through. A second portion 506 of the third material region 502 is disposed on a side of the first material region 406 and second material region 408 facing toward a surface 503 of the surface region 501. The second portions 506 of the third material regions 502, together with transparent material regions 412 define the surface region 501.

In this configuration, the white third material region 502 does not obstruct the portions of the first material region 406 and second material region 408 facing toward the transparent material regions 412 from view. Thus, to the first observer 418, primarily white from the third material region 502 and yellow from the first material region 406 are visible, and to the second observer 420, primarily white from the third material region 502 and cyan from the second material region 408 are visible. Furthermore, due to the second portion 506 of the third material region 502, as the view angle moves toward the 90 degrees perspective of a third observer 508, the apparent coloration of the surface region 501 moves toward white. In other embodiments (not shown) the third material region 502 can have different colors or combinations of colors. In another embodiment (not shown) the object 500 further includes a scatter guard disposed within the transparent material region 412 similar to the scatter guard 432 illustrated in FIG. 4B. The reader should also understand that while FIGS. 4A, 4B, and 5 illustrate two-dimensional cross-sections of three-dimensional objects 400 and 500, the arrangement of material regions can extend into a third dimension.

Figure 6:
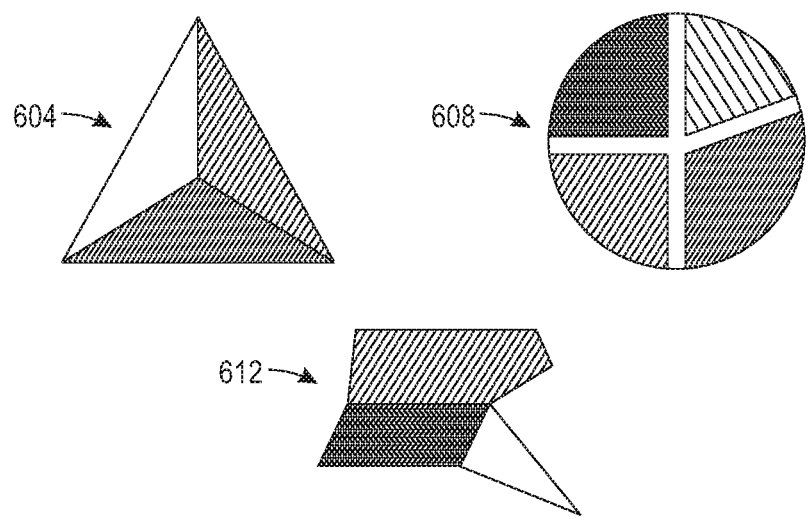
FIG. 6 is a top view of several different exemplary embodiments of arrangements of material regions having apparent colorations that change given different view angles, view directions, and illumination angles along at least two different axes, according to this disclosure.

FIG. 6 illustrates a top view of several exemplary arrangements of material regions that have different apparent colors not only from a left view direction and a right view direction, but also from a front view direction and rear view direction, or more. As illustrated in FIG. 6, differently colored material regions can be arranged in both regular and irregular shapes and with different numbers of colored material regions to achieve different coloration behaviors. The examples of FIG. 6 include a pyramid 604 having different colors on its faces, a right cylinder 608 divided into sectors having different colors, and an irregular three-dimensional shape 612 composed of different colored segments. Because the apparent coloration of a surface region due to the arrangements illustrated in FIG. 6 are different for a multitude of different view directions, such arrangements enable surface regions to have a coloration that changes with rotation of an object. As the object rotates, different sides of the arrangements are exposed to the viewer in different proportions, and thus the apparent coloration of the object to the viewer changes.

In the above embodiments, various observers are described as viewing the surface region of a three-dimensional object under, for example, generally diffuse light that is uniform regardless of view direction or view angle. However, a similar effect with a changing apparent coloration of the surface region of the three-dimensional object can be achieved with a stationary observer and a changing focused source of illumination, i.e., with illumination lighting the surface region at different angles. In other words, if the observers discussed above are replaced with focused illumination sources, at least a substantial portion of the light reflecting off of or transmitted from the three-dimensional object corresponds with the proportions of the material regions illuminated by the light from the illumination sources. This illumination results in an apparent coloration of the surface region of the three-dimensional object without regard for a location or orientation of the viewer.

In another example, a similar coloration changing effect can be achieved using non-focused illumination. For instance, the sun provides generally diffuse light at an orientation that changes throughout the course of a day. A three-dimensionally printed object according to this disclosure can be configured to exhibit a coloration that changes based on an orientation of the sun. In other words, given a fixed perspective of an observer viewing an object, relative motion between the observer, the object, and the illumination source can be used to cause coloration changes according to this disclosure.

In some embodiments, a three-dimensional object according to this disclosure may include internal illumination. Such illumination may be due to, for example, a light source disposed within the object, due to phosphorescence, or due to light transmitted into the object, such as a back-light. Changes in apparent coloration of a surface region via focused internal illumination can operate in a similar fashion to external focused illumination. In an example, internal illumination is produced within a three-dimensional object that is generally oriented in a first view direction. A substantial portion of the light that is emitted from the three-dimensional object is emitted along the first view direction and is emitted from the portions of the material regions visible along a second view direction opposite the first view direction. As a result, the apparent coloration of the surface region may be altered by changing the direction of the internal illumination.

In embodiments where illumination of the object is at least generally external, colors for the plurality of differently colored material regions advantageously includes cyan, magenta, yellow, black, white, reflective, and at least partially transparent. Conversely, in embodiments where illumination of the object is at least generally internal, colors for the plurality of differently colored material regions advantageously includes red, green, blue, black, white, reflective, and at least partially transparent. In other words, the color selection for the materials follows the principles of additive and subtractive coloration for various forms of illumination.

Figure 7A:
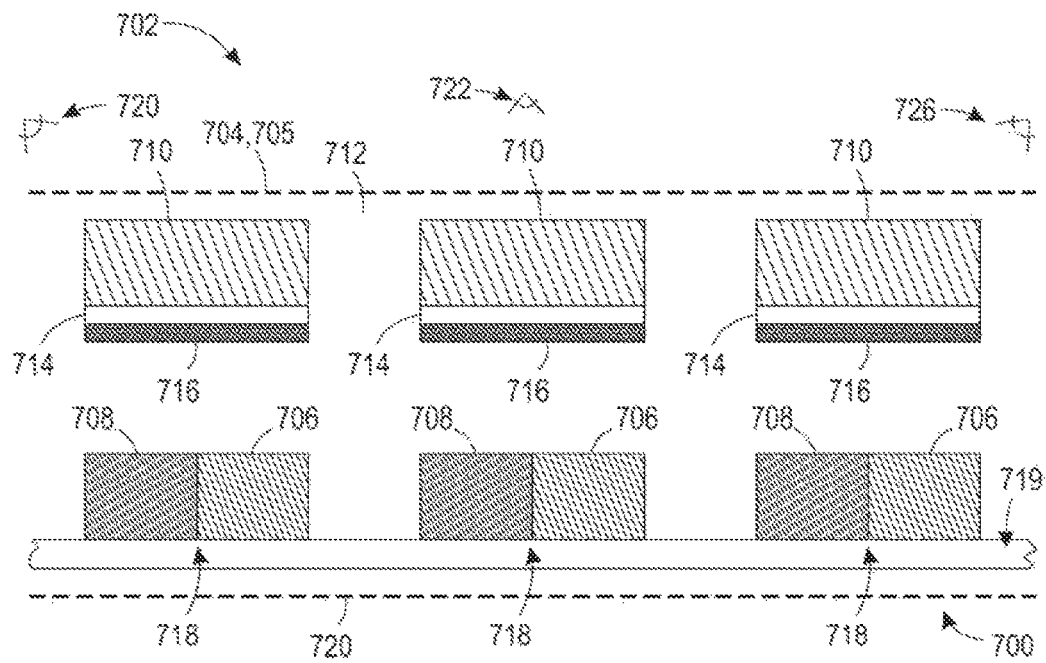
FIGS. 7A-8 are side cross-section views of further different exemplary embodiments of three-dimensionally printed objects with surfaces having an apparent coloration that changes over different view angles, view directions, and illumination angles according to this disclosure.

FIG. 7A illustrates yet another embodiment of a three-dimensional object 700 according to this disclosure. The object 700 includes arrangements 718, each of which has a first material region 706, a second material region 708, a third material region 710, a fifth material region 714, and a sixth material region 716. The object 700 further includes a base 719 that supports the first material regions 706 and second material regions 708, and a fourth material region 712 that supports the third material region 710, fifth material region 714, and sixth material region 716. The fourth material region 712 additionally encapsulates the material regions 706, 708, 710, 714, and 716, and defines a surface region 704 of the object 700 having a surface 705. The material regions 706-716 are collectively referred to as a plurality of material regions 702. The arrangements 718 combine the principles of various arrangements discussed in the other embodiments above. Other combinations are also contemplated. Such combinations enable the formation of three-dimensional objects with surface regions that have a changing coloration over both view and illumination angles and view directions.

In the embodiment of FIG. 7A, the first material region 706 is yellow, the second material region 708 is cyan, the third material region 710 is magenta, the fourth material region 712 is at least partially transparent, the fifth material region 714 is white, the sixth material region 716 is black, and the base 718 is white. In other embodiments, other colors and combinations of colors are also contemplated. In the arrangements 718, the first material region 706 and second material region 708 are disposed on the base 718, with the second material region 708 that overlaps with the first material region 706 in a direction generally parallel to the surface 705. The third material region 710 is spaced apart from the first material region 706 and second material region 708 in a direction toward the surface 705. At least a portion of the fourth material region 712 is disposed between the third material region 710 and the first and second material regions 706 and 708. The fifth material region 714 is disposed on a side of the third material region 710 facing away from the surface 705 and toward the first and second material regions 706 and 708. The sixth material region 716 is disposed on a side of the fifth material region 714 facing away from the third material region 710 and toward the first and second material regions 706 and 708. The base 718 is further configured to act as a buffer to inhibit bleed-through between, for example, the surface region 704 and a surface region 720 of the object 700. The fifth material region 714 is also configured as a buffer to inhibit bleed-through between the third material region 710 and the first and second material regions 706 and 708. The sixth material region 716 is configured as a scatter guard 716.

From the perspective of a first observer 722 viewing the surface region at approximately a 90 degree angle, the only portions of the material regions that are visible are the magenta of the third material region 710 and the white from the base 718. Thus, the surface region 704 has an apparent coloration that is light magenta. From a perspective of a second observer 724 viewing the surface region at an oblique angle and at a view direction facing toward the right, the magenta from the third material region 710, the cyan from the second material region 708, and the white from the base 718 are visible, and the surface region has an apparent coloration that is generally light blue. As the angle becomes more oblique more of the cyan from the second material region 708 becomes visible, and the surface region 704 appears bluer. Furthermore, at a highly oblique angle, yellow from a portion of the first material region 706 may become visible, and thus the surface region 704 appears to be a darker blue. From a perspective of a third observer 726 viewing the surface region at an oblique angle and at a view direction facing toward the left, the magenta from the third material region 710, the yellow from the first material region 706, and the white from the base 718 are visible so the surface region has an apparent coloration that is generally light red. As the angle becomes more oblique more of the yellow from the first material region 706 becomes visible, and the surface region 704 appears redder. Furthermore, at a highly oblique angle, cyan from a portion of the second material region 708 may become visible, and the surface region 704 appears to be a darker red.

Figure 7B:
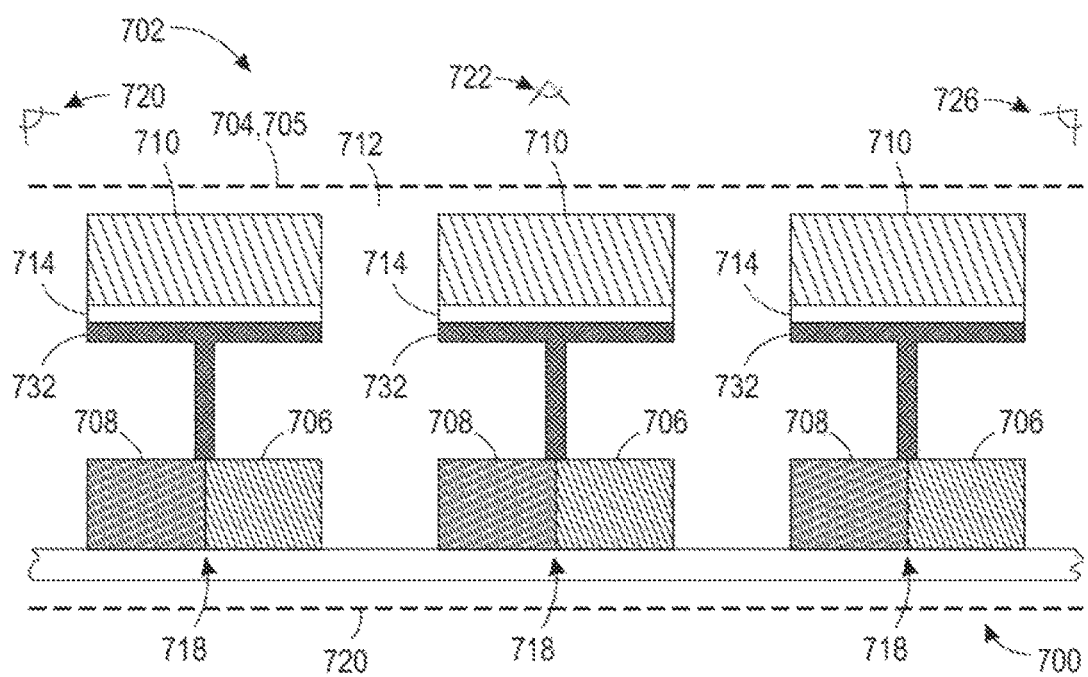

FIG. 7B illustrates a further exemplary embodiment of a three-dimensional object 730 that is similar to the object 700 in FIG. 7, except the scatter guards 716 have been replaced with alternative scatter guards 732. The alternative scatter guards 732, like the scatter guards 716 in FIG. 7A, are disposed on a side of the fifth material region 714 facing away from the third material region 710 and toward the first and second material regions 706 and 708. The alternative scatter guards 732 additionally extend toward, and in particular make contact with, the first and second material regions 706 and 708. In this embodiment, the alternative scatter guards 732 are defined by a generally T-like shape, but other shapes are also contemplated in other embodiments. The alternative scatter guards 732 are configured to visibly separate the first and second material regions 706 and 708, such that observers viewing the surface region 704 do not have visibility of both of the first and second material regions 706 and 708. Ensuring that only one of the first and second material regions 706 and 708 is visible to an observer at a time can reduce blending of the different colors of the different material regions. In this embodiment, the alternative scatter guards 732 are gray, but other colorations and combinations of colorations are also contemplated. Using a gray material for the alternative scatter guards can limit a darkening effect of the coloration of the surface region 704 from perspectives where the alternative scatter guards 432 are visible.

Figure 8:
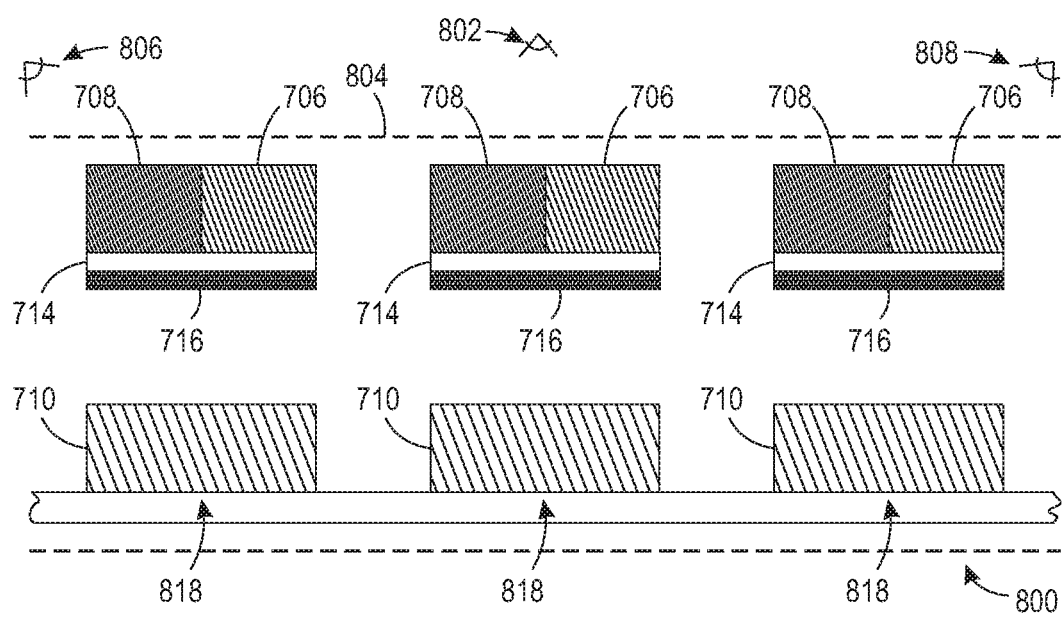

FIG. 8 illustrates another exemplary embodiment of a three-dimensional object 800 according to this disclosure. The object 800 is similar to the object 700 illustrated in FIG. 7A, but the positions of the third material region 710 and the first and second material regions 706 and 708 in arrangements 818 have been swapped relative to their positions in arrangements 718 in FIG. 7. As a result, a first observer 802 views the surface region 804 as a mixture of cyan and yellow, i.e., green. A second observer 806 viewing in a direction facing toward the right sees the surface region as a mixture of cyan and magenta, i.e., blue. A third observer 808 viewing in a direction facing toward the left sees the surface region as a mixture of yellow and magenta, i.e., red.

In a further embodiments (not shown), the object 800 can additionally include buffer regions between the first and second material regions 706 and 708 similar to the buffer regions 430 in FIG. 4B, and can additionally include scatter guards between the arrangements 818 similar to the scatter guards 432 in FIG. 4B. In further embodiments, the different arrangements and configurations described in the various embodiments above are combined, modified, and reoriented in order to form different coloration behaviors for a three-dimensionally printed object. Based on the foregoing arrangements of differently colored material regions, surface regions can be formed that appear to have different colorations for a variety of view angles, view directions, and illumination angles.

Figure 9A:
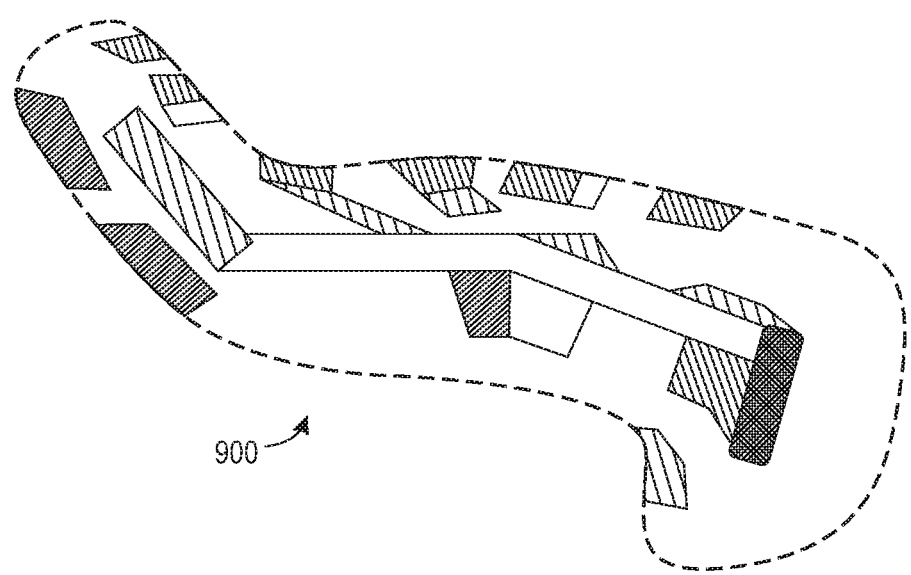
FIG. 9A is a side cross-section view of an exemplary embodiment of an irregular three-dimensionally printed object with a surface having an apparent coloration that changes over different view angles, view directions, and illumination angles according to this disclosure.

While the objects illustrated in FIGS. 1-8 appear to have a generally regular shape, irregular three-dimensional objects are also contemplated. FIG. 9A illustrates a cross sectional view of an exemplary embodiment of an irregular three-dimensional object 900 according to this disclosure that incorporates various features from the foregoing embodiments. The reader should understand that the object 900 may extend in an irregular fashion in the third dimension as well. In this fashion, surface regions with complex coloration behaviors can be formed.

Figure 9B:
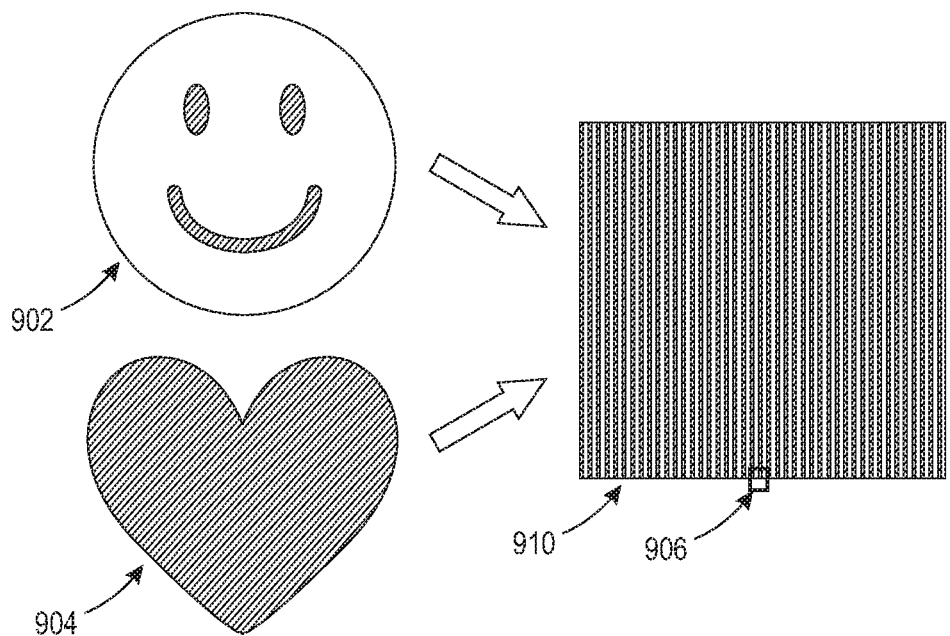
FIG. 9B is a schematic illustration of different images visible on the surface of a three-dimensionally printed object at different view angles, view directions, and illumination angles according to this disclosure.
Figure 9C:
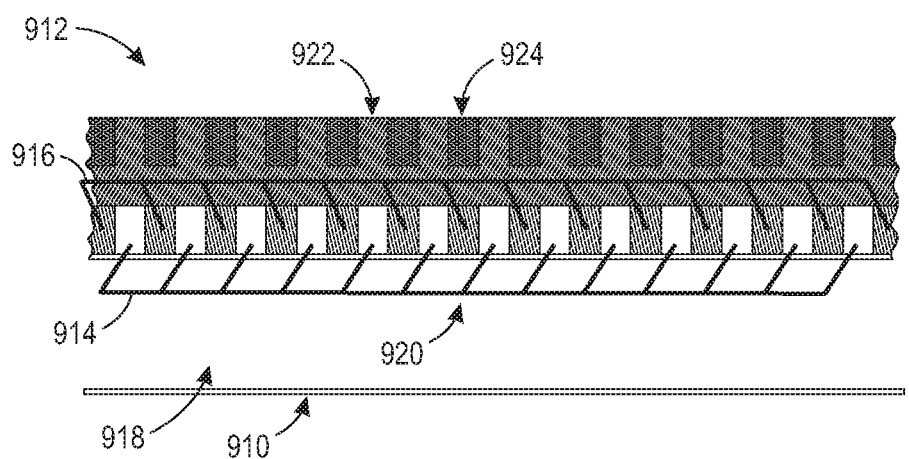
FIG. 9C is a cross-section detail view of the three-dimensionally printed object of FIG. 9B.

FIG. 9B is a schematic illustrating how different images 902 and 904 are used to form an exemplary embodiment of a three-dimensionally printed object 910 according to this disclosure having a coloration that changes between the different images 902 and 904 based on a perspective at which the object 910 is viewed. FIG. 9C illustrates a side cross section view of a detail region 906 of the object 910. The reader should understand that the depiction of the object 910 in FIGS. 9B and 9C is symbolic, and is not an accurate representation of the surface coloration of a three-dimensionally printed object according to this disclosure. In addition to not being drawn to scale, FIGS. 9B and 9C are two-dimensional images, and therefore are two-dimensional drawings that symbolize the three-dimensional viewing behaviors of objects printed according to this disclosure.

As shown in FIG. 9C, the object 910 is formed from a plurality of differently colored material regions 912 that include a first subset of material regions 914 and a second subset of material regions 916. The first subset of material regions 914 correspond to the first image 902. In other words, if the first subset of material regions 914 were viewed in isolation, the material regions would have a coloration that forms the first image 902. Similarly, the second subset of material regions 916 corresponds to the second image 904, and if viewed in isolation would have a coloration that forms the second image 904.

The plurality of material regions 912 is arranged such that when the object 910 is viewed from a first view angle, e.g., from a generally vertical angle, the first subset of material regions 914 and thus the first image 902 is primarily visible. The plurality of material regions 912 is further arranged such that when the object 910 is viewed from a second view angle, e.g., from a generally oblique angle, the second subset of material regions 916 and, consequently, the second image 904 is primarily visible. In this embodiment, the arrangement of the plurality of material regions 912 includes a base layer 918 that is white, an interlaced arrangement 920 of the first and second subsets of materials 914 and 916 disposed on the base layer 918, a transparent material region 922 disposed on top of the arrangement 920, and non-transparent regions 924 spaced apart from the arrangement 920 by the transparent material region 922. In this embodiment, the non-transparent material regions 924 are black, but other colorations and combinations of colorations are also contemplated in other embodiments. The black material regions 924 are arranged so as to at least partially overlap the second subset of material regions 916 in the vertical direction. As a result, to an observer viewing the object 910 from a generally vertical direction, the black material regions 924 at least partially obscure the second subset of material regions 916 from view while enabling visibility of at least a portion of the first subset of material regions 914 so that the first image 902 is primarily visible. Conversely, to an observer viewing the object 910 from an oblique direction, the black material regions 922 obscure at least a portion of the first subset of material regions 914 and enable visibility of at least a portion of the second subset of material regions 916 so that the second image 904 is primarily visible.

Although the images 902 and 904 are illustrated as being different images, e.g., a smiling face and a heart respectively, in other embodiments, the second image 904 could be a modification of the first image 902. For instance, the first image 902 could be a smiling face and the second image 904 could be a frowning face. In other examples, the second image 904 can illustrate an object from the first image 902 in a different position or perspective, with a different color, brightness, intensity, or with an additional optical illusion. An "optical illusion" as used herein means a visual image that, when perceived by a human observer, appears to include features not physically consistent or actually present in the visual image.

Additionally, while the coloration behavior of the object 910 was formed using the arrangement of the plurality of material regions 912 described above, other arrangements that incorporate the techniques described in this disclosure can be used to form similar coloration behaviors in other embodiments. Furthermore, while the object 910 incorporates two different images 902 and 904, three-dimensionally printed objects according to this disclosure can incorporate any number of images that are visible from any number of view angles, view directions, and illumination directions.

The arrangement of differently colored material regions that enables different colorations on a surface region of a three-dimensional object may be complex. This complexity may be exacerbated when the surface region of the three-dimensional object has an irregular shape and when the coloration has a high level of detail or color variation. Therefore, a technique for modifying a three-dimensional object to have a plurality of differently colored material regions that form a surface region with a desired iridescent coloration behavior would be beneficial. As used herein, "modify" means to change or replace, at least in part, so as to exhibit different structure or behavior, specifically with regard to an arrangement of different material regions within a three-dimensional object.

Figure 10A:
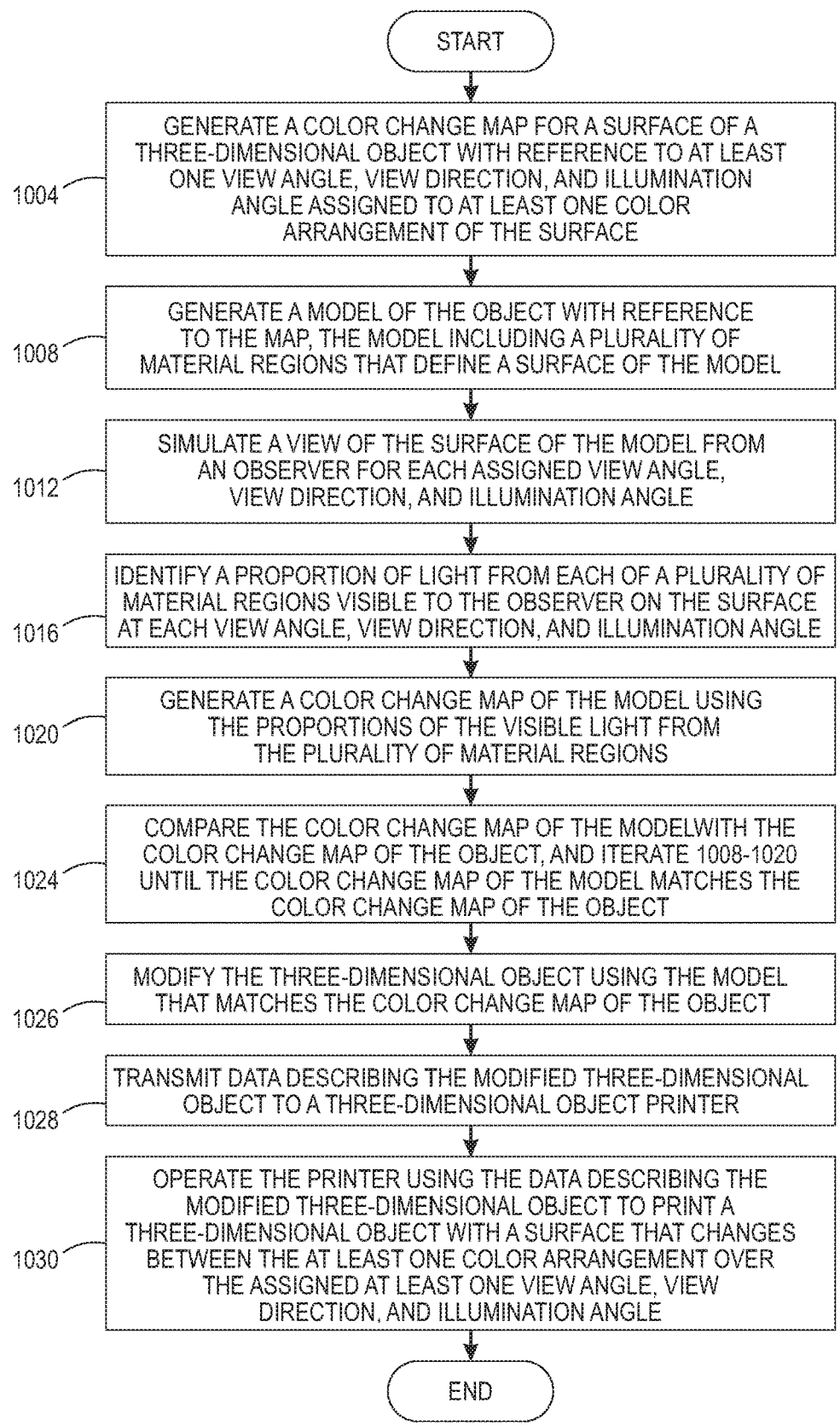
FIG. 10A is a flow diagram of an exemplary embodiment of a method for producing a three-dimensional object with a surface region that has different color arrangements visible to an observer viewing the surface region from different view directions, different view angles, and with illumination lighting the surface region at different angles, according to this disclosure.
Figure 10B:
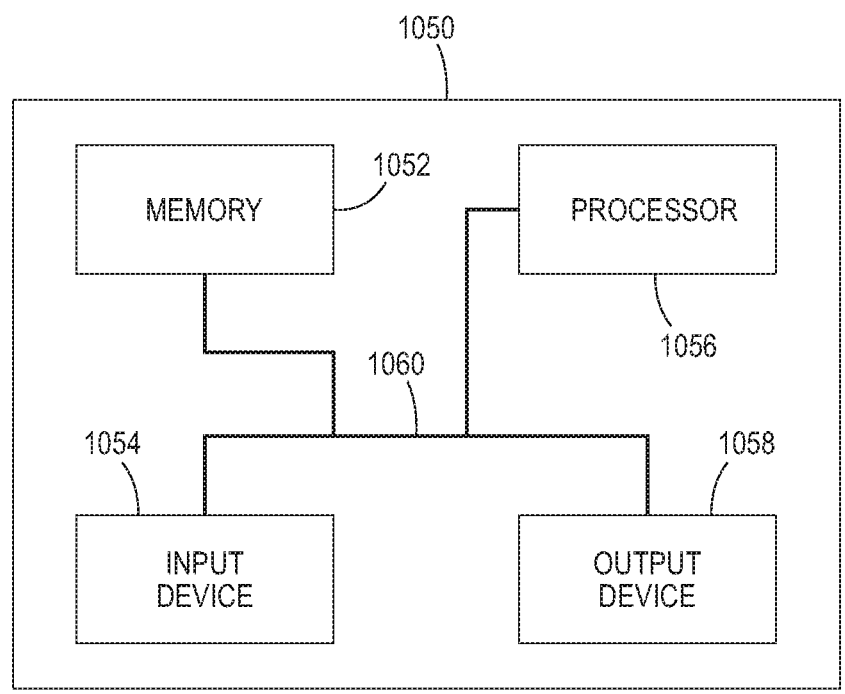
FIG. 10B is a schematic of an exemplary embodiment of a system configured to perform the method of FIG. 10A.

FIG. 10B illustrates an exemplary embodiment of a system 1050 configured to perform the method illustrated in FIG. 10A in order to produce an iridescent three-dimensional object by modifying three-dimensional data for printing the three-dimensional object so that the three-dimensional object has a surface region having different color arrangements visible to an observer viewing the surface region from different view directions, different view angles, and with illumination lighting the surface region at different angles. As shown in FIG. 10B, the system 1050 includes a memory 1052, an input device 1054, a processor 1056, and an output device 1058, which are interconnected by a system bus 1060.

Three-dimensional data for operating a three-dimensional printer is stored on the memory 1052. For example, the three-dimensional data may include data describing a three-dimensional geometry of an object to be printed, printing layer data, object material data, or other data that enables the three-dimensional printer to print a three-dimensional object.

The input device 1054 is configured to receive data corresponding to at least two different color arrangements for the surface region of the three-dimensional object, and data corresponding to at least one of a view direction, a view angle, and an illumination angle assigned to each different color arrangement. In another embodiment, the input device 1054 is further configured to receive the three-dimensional data and store the three-dimensional data in the memory 1052. The input device can also be configured to receive other information, such as user instructions pertaining to, for example, a predetermined threshold for measuring a similarity between the coloration of the different color arrangements and the resulting modified three-dimensional object.

The processor 1056 is configured with programmed instructions stored in the memory 1052 that enable the processor 1056 to modify the three-dimensional data to enable the three-dimensional object to be formed with different color arrangements visible to an observer viewing the surface region from different view directions, different view angles, and with illumination lighting the surface region at different angles. The processor 1056 is thus configured to perform the following acts, illustrated in FIG. 10A, and the output device 1058 is configured to output the modified three-dimensional data to the three-dimensional object printer.

A color change map for the surface region of a three-dimensional object is generated (block 1004). As used herein, "generate" means to produce via an algorithm, predetermined instructions, or via a mathematical process using input information. The color change map describes the coloration of the surface region from various view directions, view angles, and illumination angles, and is determined with reference to a portion of the three-dimensional data corresponding to a geometry of the surface region of the three-dimensional object, the data received by the input device that corresponds to at least two different color arrangements for the surface region, and the data received by the input device that corresponds to the at least one of the view direction, the view angle, and the illumination angle assigned to each different color arrangement. The geometry of the surface region describes the three-dimensional shape of the surface region of the object. For example, a geometry could define the surface region of a cube, a sphere, or any other regular or irregular three-dimensional shape. Color arrangements refer to a particular coloration for the surface region that is visible from the assigned view angle, view direction, or illumination angle for the generated map. For example, color arrangements for an object could include blue text with a green background from the left and yellow text with a red background from the right. Other examples for color arrangements include images, optical illusions, stereoscopic images, animations with different component images at different view points, or any other acceptable type of coloration. Each color arrangement is assigned with a particular view direction, view angle, and illumination angle. Together, the geometry, color arrangements, and view angles, view directions, and illumination angles describe the desired coloration behavior for the surface region of the object.

The process 1000 continues with the generation of a model of the object with reference to the map (block 1008). As used herein, "model" means an imitative or schematic representation of a three-dimensional element that can be used to examine properties of the element. The model includes data corresponding to a plurality of different material regions that together define a model surface region of the model. The plurality of different material regions overlap by different amounts viewed from different directions such that different proportions of light from the different material regions are visible to an observer viewing the model surface region from different view angles, different view directions, and with illumination lighting the model surface region at different angles. The model surface region roughly corresponds to the surface region of the three-dimensional object. In other words, while the internal geometry of the plurality of material regions within the model differs from the geometry of the three-dimensional object, the outer geometry of the model that defines the shape of the model generally corresponds with the shape of the three-dimensional object. The plurality of material regions within the model can be arranged randomly, or can be arranged with reference to at least one of the color arrangements.

A view of the surface region of the model from an observer is then simulated for each of the view angles, view directions, and illumination angles assigned to the various color arrangements (block 1012). As used herein, "simulate" means to enact a representation of a system, in particular of the surface region of the model, in order to predict a behavior or property of the system.

Based on the simulation, a proportion of light from each of the plurality of material regions visible to the observer at each assigned view direction, view angle, and illumination angle is identified (block 1016). As used herein, "identify" means to ascertain as having a certain characteristic or feature via an algorithm, predetermined instructions, or mathematical process that provides a numerical result with reference to the feature or characteristic. Since the different proportions of light from differently colored material regions visible at a portion of a surface region defines an apparent coloration of that portion of the surface region, the simulated proportions of visible light from material regions can then be used to form a color change map for the surface region of the model (block 1020).

The color change map of the surface region of the model is compared to the color change map of the surface region of the desired three-dimensional object to measure a similarity of at least one of color hue and color location between the generated color map of the model and the generated color map of the three-dimensional object (block 1024). If they match, i.e., if the measured similarity is greater than a predetermined threshold at the at least one of the assigned view direction, view angle, and illumination angle, then the model has achieved an arrangement of material regions that enables the desired coloration behavior (block 1028). The threshold for the measured similarity can describe, for example, a predetermined percentage of the model surface region that, when viewed in each of the assigned view angles, view directions, and illumination angles, has a coloration corresponding to the desired coloration of the surface region. The threshold can also describe a predetermined hue similarity between a color or colors visible on the model surface region and the surface region of the desired object. If the color change map of the model surface region does not match the color change map of the surface region of the desired three-dimensional object, i.e., is outside of the predetermined threshold of similarity, then the arrangement of the material regions in the model and the simulation of the views are iterated (blocks 1008-1020) until the map of the surface region and the map of the model sufficiently match (block 1024). In an example, an object is desired to appear blue from a perspective perpendicular to a surface region, and green from a perspective to the left of the surface region. An initial model is formed that appears blue from both the left and from the perpendicular view in simulated views. The arrangement of material regions in the model can then be adjusted until the desired appearance is achieved within the predetermined threshold of similarity.

The reader should understand that different materials have different optical properties that limit the coloration behavior of the materials at different view angles, view directions, and illumination angles. For example, an amount of transparency, scattering, absorption, or other properties of a material may limit a range of coloration for the material at certain view angles, view directions, and illumination angles. Additionally, such properties can affect how different materials interact when positioned proximate to each other. This interaction may exacerbate the difficulty in achieving a color change map of the surface region of the model that is within the threshold of similarity with the color change map of the desired three-dimensional object. In one embodiment, the color map of the desired three-dimensional object is adjusted so as to be limited to a predetermined selection of colors. In another embodiment, the threshold for similarity is increased in response to a determination that the desired color map is outside the range of coloration enabled by the materials available for printing. In a further embodiment, the color map for the desired object is adjusted to prioritize a change in coloration over different perspectives even if the resulting colors of the coloration do not match. For example, a desired object includes a coloration that changes from pink to green over two different perspectives. Given the available materials, a change from orange to green may not be possible over the two assigned perspectives. The color change model of the desired object is changed to be a color change from red to green instead of orange to green so that a coloration change of the desired magnitude occurs even if the precise colors of the change are different. In yet another embodiment, the color change map of the desired object is adjusted to prioritize a particular coloration behavior, such as a change over a particular view angle or view direction. In an embodiment, the colors in the coloration behaviors of the color change map of the desired object are adjusted to be a closest matching color within the range of colors enabled by the available materials.

In an example of the iteration of the color change map of the model, an initial model may include an arrangement similar to arrangement 116 in FIG. 1. In an iteration, the arrangement 116 could be replaced with a different arrangement, such as the arrangement 414 in FIG. 4. Adjustments within an iteration can also include adjusting a color of a material region, adjusting a size of a material region, adjusting a spacing between adjacent material regions, adjustments of a shape of a base region, buffer region, or scatter guard region, or any other acceptable adjustments. The views of the model can then be re-simulated to determine if the desired coloration behavior is achieved. Once the model accurately describes an arrangement of material regions that enables the desired coloration behavior, the model is used to modify the three-dimensional data for printing the three-dimensional object (block 1026). The modified three-dimensional data is then transmitted to a three-dimensional object printer (block 1028), that uses the modified data to print the object so as to have surface region having a coloration behavior defined by the different color arrangements at the assigned view angles, view directions, and illumination angles (block 1030).

In one embodiment, the system 1050 is integrated with a controller of a three-dimensional object printer. In another embodiment, the system 1050 is separate from the three-dimensional object printer, and can be configured to communicate with the printer via, for example, an electronic signal such as a signal transmitted via a network or signal line, via a disk, drive, or other portable computer-readable memory, via instructions communicated to a user, or the like. Additionally, while FIG. 10A illustrates a single processor 1056, the reader should understand that the system 1050 can be implemented with more than one processor and associated circuitry and components, each of which is configured to form one or more tasks or functions described herein.

FIG. 11 illustrates an exemplary embodiment of a three-dimensional object printer 1100 for printing a three-dimensional object 1102 according to this disclosure. The printer 1100 includes a first plurality of ejectors 1104, a second plurality of ejectors 1106, and a controller 1108. The first plurality of ejectors 1104 is operable to eject drops of material having a first color and the second plurality of ejectors is operable to eject drops of material having a second color different from the first color. The controller 1108 is configured to move (i) the first plurality of ejectors 1104 and second plurality of ejectors 1106, and (ii) the object 1102 relative to each other. The controller 1108 is also configured to operate the first plurality of ejectors 1104 and second plurality of ejectors 1106 to eject material and form first material regions 1110 and second material regions 1112 respectively, in order to form the object 1102. Other components and aspects of the printer 1100 are not included in detail for the purpose of clarity. The object 1102 and printer 1100 are not drawn to scale, and additional elements, such as support structures, actuators, and other components of a three-dimensional object printer known to those of skill in the art are not shown in FIG. 11.

In one embodiment, the controller 1108 operates the first plurality of ejectors 1104 and second plurality of ejectors 1106 to eject drops of material to form layers that gradually build together to form a three-dimensional object. In other words, each of the first plurality of ejectors 1104 and second plurality of ejectors 1106 form any first material regions 1110 and 1112 in the current layer before beginning to form a subsequent layer. In this fashion, successive layers of material are ejected to form the three-dimensional object layer by layer.

In another embodiment, the controller 1108 operates the first plurality of ejectors 1104 to fully form a first material region 1110, and then the second plurality of ejectors 1106 is operated to form a second material region 1112. In other words, the object 1102 is formed region by region, rather than layer by layer, where each individual region is formed layer by layer.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A three-dimensionally printed object comprising:
   a plurality of different material regions that define a first surface region of the three-dimensionally printed object, the plurality of different material regions including:
   a first subset of material regions, each material region in the first subset of material regions having a respective color, the first subset of material regions including at least a first material region having a first color; and
   a second subset of material regions, each material region in the second subset of material regions having a respective color, the second subset of material regions including at least a second material region having a second color that is different from the first color,
   wherein the plurality of the different material regions overlap each other by different amounts along different directions to enable (i) different proportions of light from the plurality of different material regions to be visible to an observer viewing the first surface region of the three-dimensionally printed object from at least one of different view directions, different view angles, and with illumination lighting the first surface region at different angles, and (ii) a coloration of the first surface region of the three-dimensionally printed object to be altered based on the proportions of light from the plurality of different material regions visible to an observer, such that:
   the first subset of material regions form an image in the first surface region over at least one of a first view direction, a first view angle range, and a first illumination angle range; and
   the second subset of material regions modifies the image formed in the first surface region by the first subset of material regions over at least one of a second view direction, a second view angle range, and a second illumination angle range.

2. The three-dimensionally printed object according to claim 1, wherein the second material region and the first material region are at different distances from a surface of the first surface region.

3. The three-dimensionally printed object according to claim 2, the plurality of different material regions further comprising:
   a third material region that is at least partially transparent, the third material region being positioned between the first material region and the second material region relative to the surface.

4. The three-dimensionally printed object according to claim 3, the plurality of different material regions further comprising:
   at least one fourth material region that is white, the at least one fourth material region being positioned on a side of at least one of the first material region and the second material region that faces away from the surface.

5. The three-dimensionally printed object according to claim 4, the plurality of different material regions further comprising:
   a fifth material region that is black, the fifth material region being positioned between the first material region and the third material region.

6. The three-dimensionally printed object according to claim 1, wherein the second material region overlaps with the first material region in a direction generally parallel to a surface of the first surface region.

7. The three-dimensionally printed object according to claim 6, the plurality of different material regions further comprising a transparent material region that overlaps with the first material region and the second material region along the direction generally parallel to the surface.

8. The three-dimensionally printed object according to claim 6, the plurality of different material regions further comprising:
   a third material region having a third color that is different from the first color and from the second color, at least a portion of the third material region being positioned between the first material region and the second material region.

9. The three-dimensionally printed object according to claim 6, the plurality of different material regions further comprising:
   a third material region having a third color that is different from the first color and from the second color, the first material region and the third material region at different distances relative to the surface.

10. The three-dimensionally printed object according to claim 1 further comprising:

a base, the plurality of different material regions being supported by the base; and another plurality of different material regions that together define another surface region of the three-dimensionally printed object that faces away from the surface of the first surface region such that the plurality of different material regions and the other plurality of different material regions are separated by the base, the other plurality of different material regions including:

a third material region having a third color;

a fourth material region having a fourth color that is different from the third color, the different material regions overlapping each other by different amounts viewed from different directions to enable different proportions of light from the other plurality of different material regions to be visible to an observer viewing the other surface region of the three-dimensionally printed object from at least one of different view directions, different view angles, and with illumination lighting the surface at different angles; and a coloration of the other surface region of the three-dimensionally printed object being altered based on proportions of light from the other plurality of different material regions visible to the observer.

11. The three-dimensionally printed object according to claim 3 further comprising:

a base, the plurality of different material regions being supported by the base; and another plurality of different material regions that together define another surface region of the three-dimensionally printed object that faces away from the surface of the first surface region such that the plurality of different material regions and the other plurality of different material regions are separated by the base, the other plurality of different material regions including:

a fourth material region having a third color; and a fifth material region having a fourth color that is different from the third color, the different material regions overlapping each other by different amounts viewed from different directions to enable different proportions of light from the other plurality of different material regions to be visible to an observer viewing the other surface region of the three-dimensionally printed object from at least one of different view directions, different view angles, and with illumination lighting the surface at different angles; and a coloration of the other surface region of the three-dimensionally printed object being altered based on proportions of light from the other plurality of different material regions visible to the observer.

12. The three-dimensionally printed object according to claim 5 further comprising:

a base, the plurality of different material regions being supported by the base; and another plurality of different material regions that together define another surface region of the three-dimensionally printed object that faces away from the surface of the first surface region such that the plurality of different material regions and the other plurality of different material regions are separated by the base, the other plurality of different material regions including:

a sixth material region having a third color; and a seventh material region having a fourth color that is different from the fifth color, the different material regions overlapping each other by different amounts viewed from different directions to enable different proportions of light from the other plurality of different material regions to be visible to an observer viewing the other surface region of the three-dimensionally printed object from at least one of different view directions, different view angles, and with illumination lighting the surface at different angles; and a coloration of the other surface region of the three-dimensionally printed object being altered based on proportions of light from the other plurality of different material regions visible to the observer.

13. The three-dimensionally printed object according to claim 2, the plurality of different material regions further comprising:

a third material region that is at least partially transparent, the third region encapsulating a remainder of the plurality of different material regions.

14. The three-dimensionally printed object according to claim 1, the second subset of material regions modifying the image formed in the first surface region by the first subset of material regions by at least one of an optical illusion, another image, a change in intensity in the image, and a change in a coloration of the image.

15. The three-dimensionally printed object according to claim 8 wherein the third color is black.

16. The three-dimensionally printed object according to claim 8 wherein the third material region extends to contact the first material region and the second material region.

17. The three-dimensionally printed object according to claim 16 wherein the third color is gray.

18. The three-dimensionally printed object according to claim 1 wherein the first color and the second color are each a respective one of yellow, magenta, and cyan.

* * * * *